UNITED STATES PATENT OFFICE.

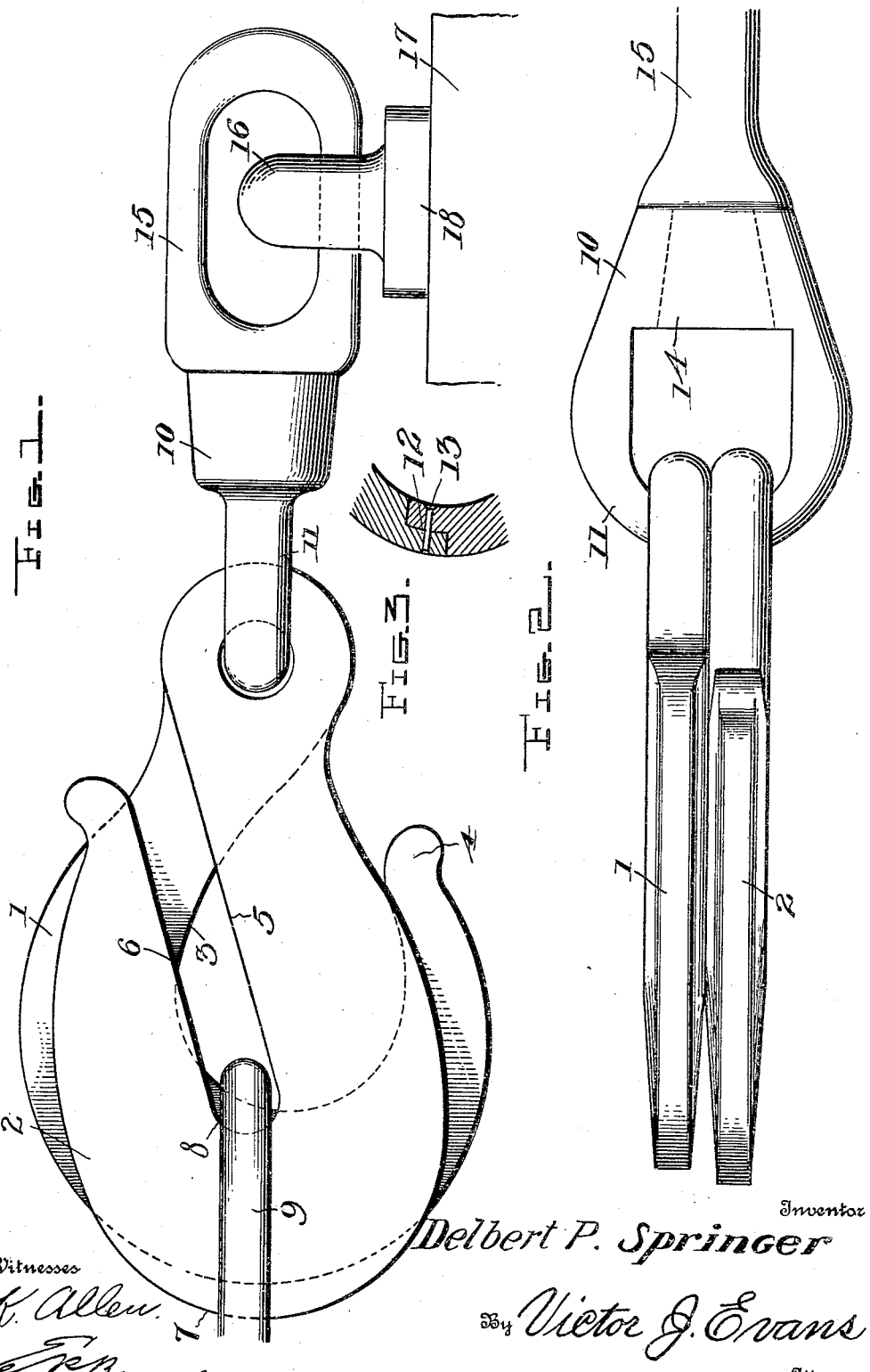

DELBERT P. SPRINGER, OF WAVERLY, NEW YORK.

DRAFT-HOOK.

935,423.  Specification of Letters Patent.  Patented Sept. 28, 1909.

Application filed March 10, 1909. Serial No. 482,548.

*To all whom it may concern:*

Be it known that I, DELBERT P. SPRINGER, a citizen of the United States of America, residing at Waverly, in the county of Tioga and State of New York, have invented new and useful Improvements in Draft-Hooks, of which the following is a specification.

This invention relates to draft hooks, and one of the principal objects of the same is to provide a swivel draft hook for use on agricultural vehicles and implements and also for use in lumber woods which shall be simple in construction and which will reliably hold the draft link without chance of accidental disconnection.

Another object of the invention is to provide a draft hook comprising a pair of lap hooks one of which has an opening provided with parallel sides, while the other hook is provided with a curved opening whereby the draft link may slide upon one of the hooks and be carried by the other.

Still another object of the invention is to provide a swivel for the lap hooks, said swivel being connected to a loop or link attached to a doubletree by means of a suitable staple or keeper, whereby the hooks may have universal movement to prevent tangling of the draft chains.

These and other objects may be attained by means of the construction illustrated in the accompanying drawing, in which,—

Figure 1 is a side elevation of a swivel draft hook made in accordance with my invention and shown connected to a staple or keeper secured to a doubletree. Fig. 2 is a top plan view of the hooks, the swivel and the shank of the loop upon which the swivel is mounted. Fig. 3 is a detail sectional view illustrating the manner of connecting together the two members of the swivel after the hooks have been engaged therewith.

Referring to the drawing, the numeral 1 designates the draft hook, and 2 is the guard hook. The hook 1 is provided with a curved inner wall 3 and an inwardly extending bill 4, while the hook 2 is provided with an opening having parallel walls 5, 6. Upon reference to Fig. 1, it will be seen that the hook 2 extends outward beyond the hook 1, as at 7, while the slot or entrance to the hook 2 extends beyond the opening in the hook 1, as at 8. As a result of this construction the draft loop 9 when connected to the hooks exerts the entire draft upon the hook 1, while the guard hook 2 holds the link 9 in connection with the hook 1, said loop 9 being carried around the curved wall 3 of the hook 1 by the movement of the hook 2. The hooks 1 and 2 are oppositely disposed one to the other, and they are both connected to a swivel 10, said swivel having a loop 11, the opposite sides of which are rabbeted, as at 12, and secured together by a rivet 13 after the hooks 1 and 2 have been connected to the loop 11. The swivel 10 is provided with a tapering aperture 14, and a stud upon the end of a loop 15 extends into the aperture 14 and thus connects the swivel 10 to the loop 15, at the same time permitting the swivel 10 to rotate about the stud upon said loop. The loop 15 is connected by means of a staple 16 to a doubletree 17, said loop or keeper 16 having feet 18 secured by bolts to said doubletree. It will be obvious, however, that the draft hooks, the swivel and the link 15 may be utilized in other relations wherever a draft hook is required.

My invention is of comparatively simple construction, cannot readily get out of order, is reliable in use, will not permit the chains to become tangled and is very strong and durable.

I claim:—

1. A draft hook comprising a pair of lap hooks, one of said hooks being a draft hook and provided with a curved inner wall, and the other hook serving as a guard hook and provided with a slot having parallel walls, said slot extending beyond the curved inner wall of the draft hook, said guard hook extending beyond the draft hook and both of said hooks being connected to a swivel.

2. A draft hook comprising a hook member and a guard member oppositely disposed and connected to a swivel, said guard member extending beyond the hook member, the opening in the guard member having parallel walls, and said opening extending beyond the opening in the hook.

In testimony whereof I affix my signature in presence of two witnesses.

DELBERT P. SPRINGER.

Witnesses:
  JOHN A. CAMPBELL,
  ANNIE V. JONES.